United States Patent [19]
Benton

[11] 4,341,951
[45] Jul. 27, 1982

[54] ELECTRONIC FUNDS TRANSFER AND VOUCHER ISSUE SYSTEM

[76] Inventor: William M. Benton, Rte. 1, Box 191, Middleburg, Va. 22117

[21] Appl. No.: 166,689

[22] Filed: Jul. 2, 1980

[51] Int. Cl.³ .............................................. G06F 15/30
[52] U.S. Cl. .................................... 235/379; 364/406; 235/381
[58] Field of Search ............... 235/379, 380, 381, 382, 235/432; 340/149 R, 149 A, 152; 364/401, 406, 518, 708, 709, 710

[56] References Cited

U.S. PATENT DOCUMENTS

| | | |
|---|---|---|
| 3,651,310 | 3/1972 | Link . |
| 3,934,122 | 1/1976 | Riccitelli . |
| 3,982,103 | 9/1976 | Goldman . |
| 4,001,550 | 1/1977 | Schatz . |
| 4,007,355 | 2/1977 | Moreno . |
| 4,032,931 | 6/1977 | Haker . |
| 4,053,735 | 10/1977 | Foudos . |
| 4,105,156 | 8/1978 | Dethloff . |
| 4,115,870 | 9/1978 | Lowell . |
| 4,172,552 | 10/1979 | Case et al. . |
| 4,197,986 | 4/1980 | Nagata . |

Primary Examiner—Thomas A. Robinson
Attorney, Agent, or Firm—Lowe, King, Price & Becker

[57] ABSTRACT

In a system for transferring electronic funds data in lieu of cash between vendees and vendors associated with a sponsoring financial institution, each vendee is provided with an identification card and a portable electronic device to be presented to the vendor upon making a purchase. The electronic device contains a keyboard for entering a vendee identification number as well as the purchase amount and a memory for storing a corresponding identification number, account balance and transaction amount. The portable electronic device contains a first inlet for receiving an edge of the identification card. A magnetic head reads data recorded on the card to turn the device on if the card corresponds to the particular device. A second inlet within the device receives vouchers prepared by the vendor reflecting the amount of the transaction. Manually operated printing rolls within the second inlet print a series of encoded bands on the voucher to verify the transaction if the vendee is satisfied with the purchase. If the vendee has keyboard entered the correct identification number and the account balance is large enough to support the purchase, the account balance stored in memory is debited by the purchase amount during a voucher printing cycle. The identification card and associated electronic device can be used in environments other than funds data transfer, e.g., access security.

13 Claims, 14 Drawing Figures

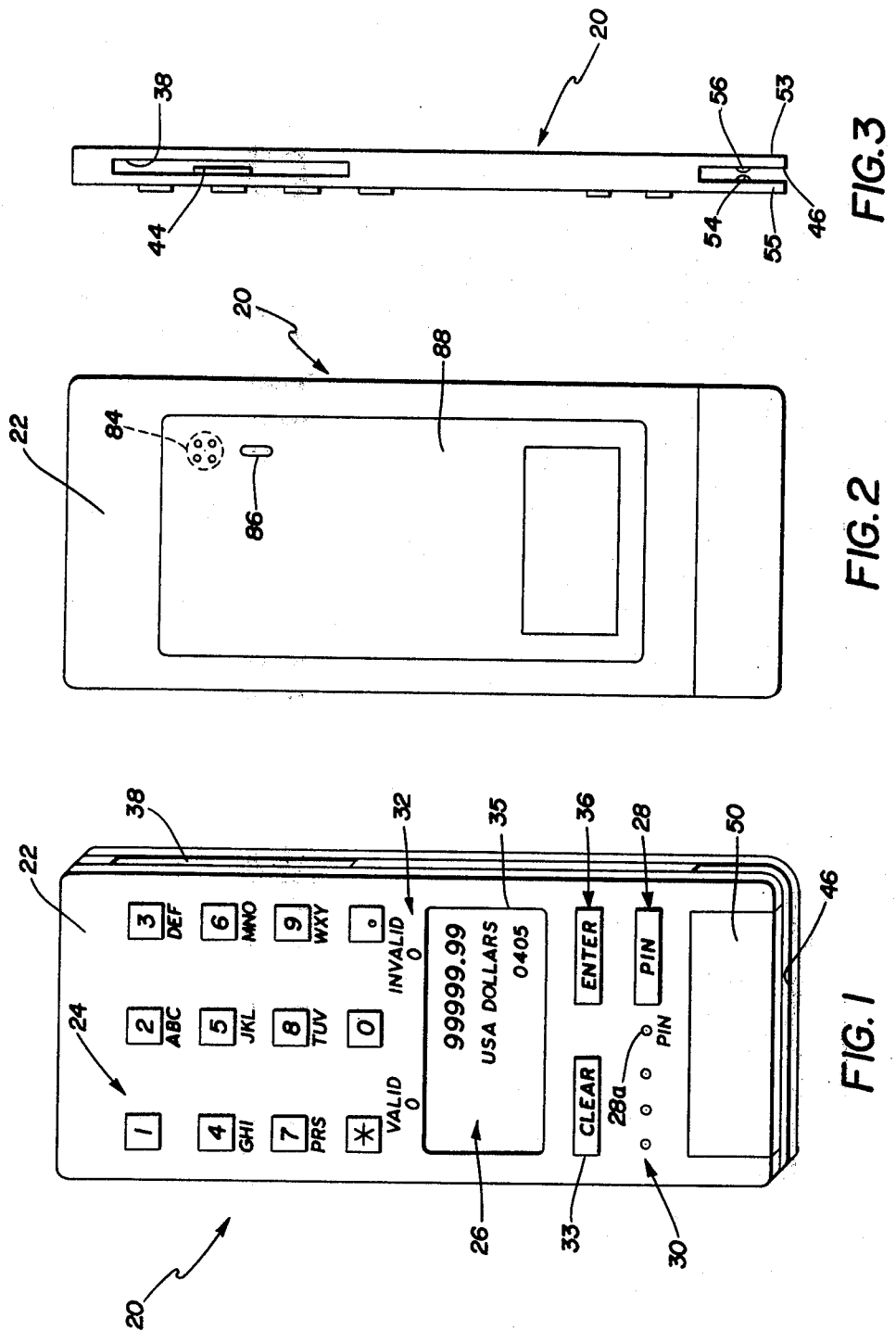

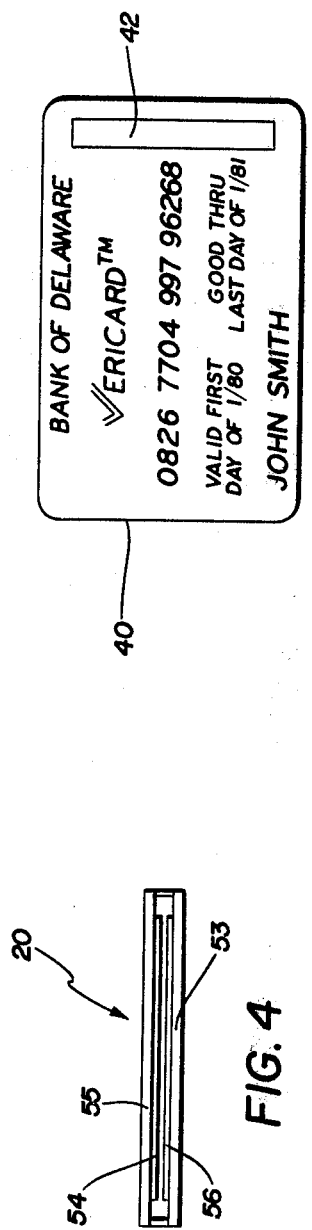

ELECTRONIC FUNDS TRANSFER AND VOUCHER ISSUE SYSTEM

TECHNICAL FIELD

The present invention relates generally to access security systems, and more particularly, to an off-line electronic funds transfer system including a portable electronic device that stores account and identification data to authorize transactions and following transactions prints verification data onto vouchers.

BACKGROUND ART

Several prior art systems of which I am aware have been provided for enabling electronic funds transfer to be made between vendees and vendors in lieu of cash. In Moreno U.S. Pat. No. 4,007,355, for example, cashless transactions are made using vendee and vendor credit cards through a special interface apparatus located at the vendor station. The cards themselves contain funds data storage capability. No voucher verifying the transaction is issued. Haker U.S. Pat. No. 4,032,931 discloses a keyboard assembly for transferring financial data between vendees and vendors. No cards are involved and funds data transfer is made during each transaction between the point of sale and a central computer.

Riccitelli U.S. Pat. No. 3,934,122, Schatz U.S. Pat. No. 4,001,550 and Dethloff U.S. Pat. No. 4,105,156 are examples of electronic funds transfer systems wherein credit cards containing memory devices store account balance and other information to be accessed during funds transfer transactions. There is no provision in these systems, however, for determining whether the transaction is authorized based upon vendee identification and account balance and no provision for issuing a voucher verifying the transaction.

Foudos U.S. Pat. No. 4,053,735 discloses a portable electronic device for issuing bank-assured checks wherein a credit amount is loaded into memory and transaction amounts successively debited from the credit balance. If the vendee keyboard enters correct vendee identification data, and the purchase amount, also keyboard entered, is less than the present account balance, the vendee is authorized to manually operate a check printer incorporated within the device for issuing the assured check.

In Link U.S. Pat. No. 3,651,310, a combination voucher and printer and credit card validator reads an identification number recorded on a credit card while imprinting the voucher and transmits this number to a memory. The credit card number is compared with a list of invalid credit card numbers to determine card validity.

In Nagata U.S. Pat. No. 4,197,986, a funds data transfer system is disclosed which is usable both on-line and off-line to authorize transactions. Account balance is stored on a credit card and electrically up-dated following each transaction. The card also controls issuance of a sales slip.

Goldman U.S. Pat. No. 3,982,103 discloses a credit card transaction verifier that reads account balance data as well as additional data magnetically recorded on a credit card. The recorded data are up-dated following each transaction. The verifier is adapted to operate either on-line or off-line.

In case et al. U.S. Pat. No. 4,172,552, a credit card processing system includes a reader for reading data encoded in the magnetic stripe of a card. The same data are printed at the point of sale along the bottom of the vendor's bank sales slip. The card reader makes cuts in the bank copy to designate the transaction as a credit or charge transaction.

Two portable, microprocessor based calculator units for continuously storing account balance and transaction information are marketed by JS&A, 1 JS&A Plaza, Northbrook, Ill. 60062. The first device, known as "CORVUS CHECK-MASTER", keeps a running balance of expenditures against a total balance, alterable at any time by the user. The second device, known as "ELECTRONIC WALLET", contains two non-volatile memories for storing two difference balances that are selectively debited by entering transaction data at a keyboard. Neither device, however, is capable of verifying transactions or issuing validated transaction vouchers.

Accordingly, one object of the present invention is to provide a system for performing electronic funds transfer in lieu of cash transactions and for issuing transaction verifying vouchers in duplicate, wherein the copy is retained by the vendee for record keeping.

Another object is to provide such an electronic funds transfer system wherein the vouchers are printed with encoded data at the point of sale to verify completion of the transaction.

Another object is to provide such an electronic funds transfer system wherein each vendee is provided with a portable electronic device that verifies that the vendee is authorized to make a purchase transaction based upon proper entry of a vendee identification number as well as by verification of an adequate account balance.

A further object is to provide a new and improved electronic funds transfer device which stores account and transaction data and verifies vouchers or drafts by imprinting encoded data on the voucher or draft upon completion of each authorized transaction.

Another object is to provide a new and improved electronic funds transfer device that is portable and microprocessor based, is small enough to be carried in a wallet and has a width equal to the width of a standard credit card.

In commercial transactions, checks are mailed by the vendor to the issuing banks where the checks are posted, cancelled and returned by mail to the vendees. This process, known as check truncation, is expensive and costs of truncation increase with increasing postage rates. On ACH (Automatic Clearinghouse) banks are now permitted by the Government to issue a statement to customers summarizing previous transactions rather than returning cancelled checks. Customers, however, tend to prefer receiving cancelled checks for permanent record keeping.

An additional object of the invention, therefore, is to provide a system for transferring electronic funds data between vendees and vendors in lieu of cash, wherein a verified voucher is issued confirming each completed transaction, the voucher is forwarded by the vendor to the sponsoring institution and a copy of the voucher is retained by the vendee, thereby eliminating conventional check truncation.

DISCLOSURE OF INVENTION

In a system for providing electronic funds transfer in lieu of cash between vendees and vendors under the sponsorship by an authorized financial institution, each vendee carries an identification card and pocket-sized, microprocessor based electronic device, or verificatory, that stores account and transaction data and imprints encoded data on vouchers or drafts presented by vendors for verification during transactions. Each verificatory includes a keyboard for entering identification and transaction data and a readout for displaying the account balance and amount of a current transaction. In addition, the verificatory includes sequence indicator lamps for requesting input data and displaying valid and invalid entries.

A first inlet at one side of the verificatory is adapted to receive an edge of the identification card having institution issued indicia recorded thereon. An electromagnetic head within the first inlet reads the card data for comparison with prerecorded corresponding data. If there is a match between the card data and prerecorded data, the keyboard is enabled.

A second inlet at one end of the verificatory is adapted to receive vouchers or drafts supplied by the vendor for verification following authorization and completion of a requested purchase transaction. A set of printing rolls within the second inlet prints encoded verification bands on the draft or voucher to verify completion of the transaction. The set of rolls comprises a pair of rolls normally separated from each other at the inlet to permit the voucher or draft to be inserted between them. The upper roll contains a series of bands having widths and interband spacings corresponding to data identifying the vendee account. To complete a purchase transaction, the vendee manually moves the identification band roller into contact with the voucher to impart thereto the identification band verification markings.

In operation, the vendee presents his card and verificatory at the point of sale, and enables the device by inserting the identification card into the first inlet in the verificatory. The vendee then removes the identification card from the verificatory and hands the card to the vendor for preparation of a voucher using a conventional credit card imprinter of a type supplied, for example, by Addressograph-Multigraph, International. To make a payment, the vendee keyboard enters the amount of the transaction and presses an ENTER key. The transaction amount is displayed in the readout. The vendee is then instructed by the verificatory via the sequence indicator to keyboard enter the personal identification number. The verificatory now automatically compares the keyboard entered identification number with a prerecorded identification number in ROM and compares the keyboard entered transaction amount with the account balance stored in RAM. As a safeguard, the device is programmed to respond to entry of an incorrect personal identification number. If the keyboard entered personal identification number does not match the stored personal identification number, the vendee is required to make two successive entries of the correct personal identification number. This procedure reduces the possibility of use of the device by an unauthorized vendee attempting to enter identification data based on guess work.

Assuming that the keyboard entered identification number matches the stored identification number and that the keyboard entered transaction amount is less than or equal to the stored account balance, the sequence indicator will indicate to the vendee and vendor that the transaction is authorized. The voucher, prepared by the vendor to indicate the transaction amount, is inserted into the second inlet of the verificatory between the printing rolls. The banded printing roll is now pressed against the voucher and the voucher withdrawn from the inlet to make the verification markings. As the verification markings are being printed onto the voucher, the amount of the requested transaction is subtracted from the account balance stored in RAM and the result is stored. The account balance and amount of last transaction are displayed on demand using, respectively, the "0" and "*" keys.

The identification card and associated verificatory can be used in systems other than funds data transfer, e.g., access security. Access to a restricted area is given only to authorized personnel by inserting a security card held by the candidate requesting entry into the verificatory and having the candidate keyboard enter his personal identification number. If entry is authorized the verificatory signals the authorization and prints an approval voucher. The voucher is later machine read to provide a traffic summary.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 1 is a perspective view of a microprocessor based, electronic funds transfer device in accordance with the invention;

FIG. 2 is a back view of the device in FIG. 1 showing a memory access terminal and back plate lock;

FIG. 3 is a side view of the device in FIG. 1 showing the first inlet for receiving an encoded portion of an identification card;

FIG. 4 is an end view of the device in FIG. 1 showing the second inlet for receiving vouchers for verification;

FIG. 5 is a top view of an identification card used in the invention;

FIG. 6 is a top view of a voucher used in the invention;

BEST MODE FOR CARRYING OUT THE INVENTION

Referring to FIGS. 1-4, an electronic device 20, referred to hereinafter as verificatory, is used together with an identification card 40 (FIG. 5) to determine whether an individual presenting the card is authorized to receive a privilege issued by a sponsoring institution, e.g., to gain access to a security area or to complete a funds data transaction, and upon authorization, to issue an encoded verification document. Although the present invention is applicable in many limited access environments, the present description shall be directed by way of example of electronic funds data transfer.

Figure 7:
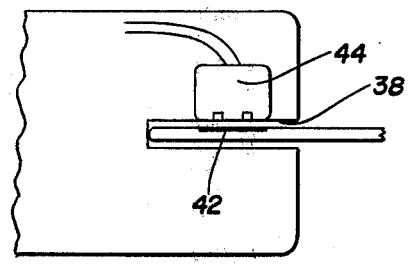
FIG. 7 is a cross sectional view of the device in FIG. 1 exposing the card reader within the first inlet.

Verificatory 20 includes an impact resistant plastic housing 22 carrying a push button keyboard 24, a first display 26 for displaying account and transaction data and a second display 30 for displaying the operating sequence of the verificatory. Housing 24 also carries a third display 32 indicating whether a requested transaction is valid or invalid, a key 33 for clearing keyboard entered data, a key 28 for enabling the verificatory to accept a vendee personal identification number (PIN) and an ENTER key 36 for causing the verificatory to accept keyboard entered data. A first inlet 38 at one side of the housing 22 receives an edge portion of the identification card 40 for reading data magnetically encoded on stripe 42 (see FIG. 5). The magnetic data are read by an electromagnetic head 44 located within the housing 22 adjacent inlet 38, as shown in FIG. 7. A second inlet 46 positioned at one end of the housing 22 is adapted to receive vendor issued transaction vouchers, such as voucher 48 shown in FIG. 6. Adjacent the inlet 46 of the housing 22 is a manually depressable bar 50 that causes encoded verification data in the form of bands 51 (see FIG. 6) to be printed on an end portion of the voucher 48. A gate 57 suspended from print bar 50 at pivot 59 and spring biased in a closed position encloses the inlet 46 in the absence of a voucher 48. The gate 57 provides two functions; it seals the inlet from ingress of dust and makes it impossible to initiate a print cycle by depressing bar 50 in the absence of a voucher 48.

Figure 9:
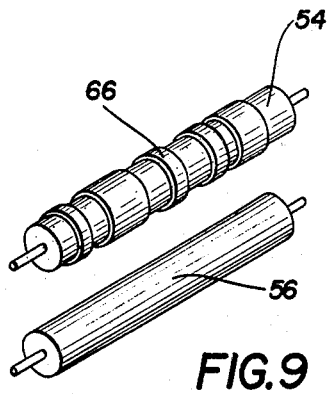
FIG. 9 is a perspective view of the banded printing roll shown in FIG. 8.
Figure 8:
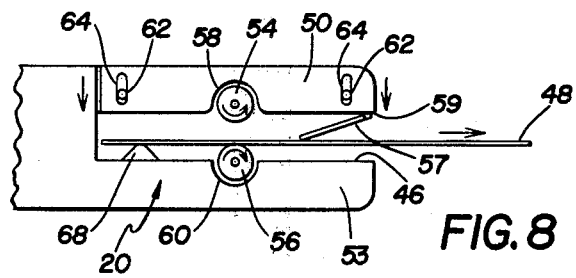
FIG. 8 is a cross sectional view of the device in FIG. 1 showing details of the printing rolls.

Referring to FIG. 8, a pair of printing rolls 54 and 56 are rotatably supported on bar 50 and lower housing portion 53 within recesses 58 and 60, respectively. The bar 50 in turn is supported on upper housing portion 55 (FIG. 3) by pins 62 that ride within elongated slots 64 formed in the housing. The bar 50 is biased by springs (not shown) into the position shown in FIG. 8 wherein roll 54 is separated from roll 56 by a distance substantially larger than the thickness of a voucher 48. The upper roll 54, shown in detail in FIG. 9, is formed with surface bands 66 having widths and interband spacings corresponding to data identifying the vendee. The band portions 66 of the upper roll 54 are permanently impregnated with graphite or other printing medium. Alternatively, voucher 48 may be provided with a carbon paper layer.

The voucher 48, when inserted into inlet 46, rests on lower roll 56 as well as on a switch operator 68 that is in contact with the lower surface of voucher 48. A normally open electrical switch 69 is closed by downward indexing of the operator 68 by print bar 50. The operator 68 extends slightly above the top of lower roll 56. Thus, when bar 50 is manually depressed by the vendee with a voucher 48 in position within inlet 46, as shown in FIG. 8, the operator 68 is urged downwardly closing the electrical switch 69 while printing roll 54 is pressed into printing position on the upper surface of the voucher. The closing of electrical switch 69 signals to the verificatory 20 that a printing operation is under way. With the print bar 50 still depressed, the vendee withdraws the voucher 48 from the housing 22 to cause the upper surface of the voucher to become imprinted with the identification bands 51 (FIG. 6).

Figure 10:
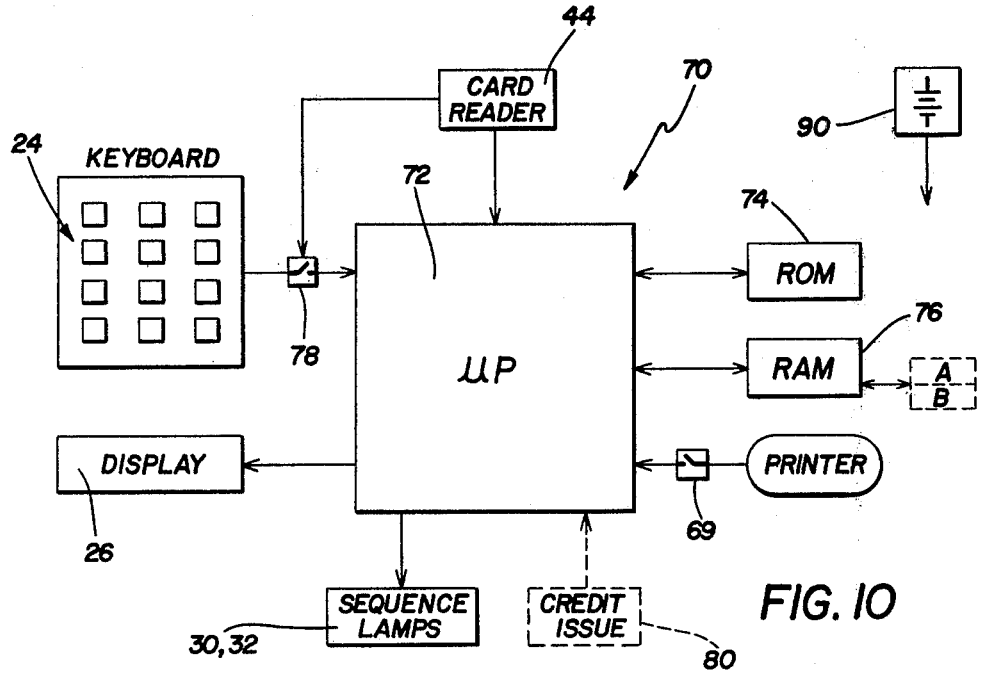
FIG. 10 is a block diagram of circuitry constituting the device in FIG. 1.

Referring now to FIG. 10, electronic circuitry 70 within housing 22 includes a microprocessor 72, such as a Motorola Model 6800, 8-bit microprocessor interfaced with an ROM 74 and a RAM 76. The RAM 76 may be a Motorola Model 5101 integrated circuit; ROM 74 may be a Motorola Model MC65830A integrated circuit. It is to be understood, however, that other microprocessors or memories could be used providing quiescent current drain is low. Low quiescent current drain is important since microprocessor 72 and RAM 76 are always energized. The RAM must remain energized since it is a volatile memory; the microprocessor must remain energized to process card read data (there is no on/off key).

Microprocessor 72 is also interfaced to receive data manually entered by keyboard 24. A switch 78 between keyboard 24 and microprocessor 72, controlled by card reader 44, inhibits the output of the keyboard 24 unless the data magnetically encoded in stripe 42 of identification card 40 are identical to corresponding data stored in ROM 74. Thus, switch 78, which is normally open, is closed to enable entry of keyboard data to microprocessor 72 only if card 40 inserted within inlet 48 is the card that is issued for use with the particular verificatory 20; otherwise, the device is disabled. The verificatory 20 is thus, in a sense, "turned on" by card 40; there is no on/off key within keyboard 24 and, as aforementioned, the electronic circuitry within the verificatory 20 is never deenergized. Alternatively, the circuitry 70, except for RAM 76, may be normally de-energized to conserve battery power, and energized only when card 40 is inserted within inlet 38 in response to closure of a microswitch (not shown) within the inlet.

The microprocessor 72 is also interfaced with print bar 50 through switch 69. The switch 69, as mentioned above, is normally open and is closed in response to depression of switch operator 68 during a manual printing cycle.

Also interfaced with microprocessor 72 are account and transaction numerical display 26 as well as sequence lamps 30, 32. The data supplied to display 26 and lamps 30, 32 by microprocessor 72 are obtained from ROM 74 and RAM 76. The RAM 76 includes a pair of accumulators A and B for temporarily storing keyboard entered transaction and personal identification data as well as for storing account balance data. Data to be displayed by display 26 as well as by lamps 30, 32 are supplied to the display and lamps by accumulators A and B. These accumulators A and B also provide temporary storage of data during arithmetic manipulation by microprocessor 72 in a conventional manner.

Microprocessor 72 is also interfaced with a data generator 80 located at the authorized institution for issuing credit to the vendee by supplying to the microprocessor and RAM 76 an initial account balance which may reflect an amount maintained by the vendee on deposit with the institution or may represent an amount greater than the deposit reflecting a credit advance. The output of generator 80 is supplied to microprocessor 72 through external terminals 84 on the rear of housing 22 behind backing plate 88, as shown in FIG. 2. Backing plate 88 is provided with an access slot 86 for receiving a key held by the sponsoring financial institution. The access slot 86 enables the sponsoring institution to remove back plate 88 to load RAM 76 with initial or supplemental funds, to change batteries 90 (FIG. 10), or to inspect or service the circuitry 70.

Microprocessor 72 is programmed by firmware in ROM 74 to operate in either a payment mode, a status request mode or a transaction verification mode. The payment mode enables the vendee to make purchases from a vendor using electronic funds data transfer in lieu of cash. In the status request mode, the verificatory 20 displays the account balance. In the verification mode, the amount of the last transaction is displayed. In all three modes, the verificatory 20 is rendered operative only if the identification card 40 is an authorized one and if the vendee keyboard enters the correct personal identification number.

In the payment mode, characterized by the making of a purchase of goods or services by a vendee from a vendor, both of whom are members of a sponsoring institution, the vendee presents funds transfer device money and card 40 at the point of sale. The vendee inserts card 40 into inlet 38. Data magnetically prerecorded on the card 40 is read by head 44. If the card 40 is not the proper card corresponding to that particular verificatory 20, the device 20 will remain disabled; there will be no response. If the card is verified as being a proper card corresponding to that verificatory 20, on the other hand, the "P" lamp of sequence display 30 will light indicating that payment data are being requested. The amount of the payment transaction is now keyboard entered and that amount is displayed in readout 26 for visual verification. ENTER key 36 is now depressed to cause the transaction amount data to be stored in memory 76; the display 26 is reset. PIN display 28a is energized to indicate that entry of the personal identification number is requested. Following depression of PIN key 28, the personal identification number is keyboard entered by the vendee, followed by depression of ENTER key 36. The personal identification number is not displayed. Only if the keyboard entered personal identification number matches the institution issued personal identification number stored in ROM 64, the PIN indicator 28a will turn off. If the keyboard entered personal identification number is incorrect, as another level of security, the verificatory 20 will require the vendee to keyboard enter the personal identification number correctly twice in succession. The keyboard entered transaction amount is now compared with the account balance. If the account balance is greater than or equal to the transaction amount, the VALID lamp of indicator 32 will turn on; otherwise, the INVALID lamp turns on.

A voucher 48 (FIG. 6) supplied by the vendor and containing the summary of the transaction is positioned within inlet 46 for printing of verification bands 51. With the voucher properly aligned, and the vendor having witnessed that the VALID lamp is energized, the vendee depresses the print bar 50 and withdraws the voucher 48, thereby imprinting verification bands 51 on the surface of the voucher. The VALID lamp 32 is now deenergized and the transaction amount displayed in readout 26 is replaced with the word PAID. The PAID display remains visible for approximately six seconds or other predetermined time interval. The transaction amount is now subtracted from the account balance and the new balance is stored in RAM 76. The amount of the transaction is stored in a separate portion of memory to be accessed for later verification if requested. The voucher 48 is signed by the vendee; the vendee keeps the original and a copy is given to the vendor. The copy is forwarded by the vendor to the sponsoring financial institution where the vendee's account is debited. Since the original copy of the voucher has been cancelled by imprinting thereon bands 51, the original voucher is cancelled; there is no need for separate truncation by the sponsoring institution.

To make a status request wherein the account balance is displayed in readout 26 or to make a transaction verification wherein the amount of the immediately previous transaction is displayed, the identification card 40 is positioned in inlet 38 of the housing 22. If the identification card 40 correctly corresponds to the verificatory 20, e.g., the card and verificatory have identical account numbers (the last four numbers of the account may be printed on the verificatory as shown in FIG. 1 at 35), the P lamp of sequence display 30 is energized. The * key is depressed to indicate to device 20 that a status request is being made. The ENTER key 36 is now depressed and in response, the PIN sequence indicator 28a is energized. The personal identification number is keyboard entered by the vendee. Assuming the keyboard entered personal identification number matches the personal identification number stored in ROM 74, the S lamp is energized and the P lamp is deenergized. If the account status is to be displayed, the "0" key and ENTER key are successively depressed. If verification of the immediately previous transaction is to be displayed, however, the * key and ENTER key 26 are successively depressed. If the personal identification number entered by the vendee at keyboard 24 does not match the personal identification number stored in ROM 74, PIN sequence indicator 28a will not be deenergized and no information will be displayed or transaction approved unless the correct personal identification number is keyboard entered by the vendee correctly twice in succession.

The contents of RAM 76 and ROM 74 are as follows:

RAM Locations

0100—Cash which is available in account.
0101—Amount to be paid out.
0102—Amount of last transaction.
0103—Personal identification number (PIN).
0104—Control number furnished by banking institution.
0105—Record of wrong PIN number submitted by operator.
0106—Area used by processor to determine if a payment request has been initiated.
0107—Area used by processor to determine if a status request has been initiated.
0108—Card identification number.

ROM Locations

0200—PIN number.
0201—Control number.
0202—Contains the encoded value for displaying the "PAY" indicator.
0203—Contains the encoded value for displaying the "PIN" indicator.
0204—Contains the encoded value for displaying the "STATUS" indicator.
0205—Contains the encoded value for displaying the "INVALID" indicator.
0206—Contains the encoded value for displaying the "VALID" indicator.
0207—Contains the encoded value to cause the display to exhibit the word "PAID".
0208—Contains card identification number.
0209—Contains logarithm of card identification number.

Microprocessor 72 is programmed to perform the sequence of operations described above. An exemplary program in accordance with the preferred embodiment is illustrated in FIGS. 11a–11d. Each programming step shown in those Figures is conventional and known by persons of ordinary skill in the microprocessor programming art.

Figure 11A:
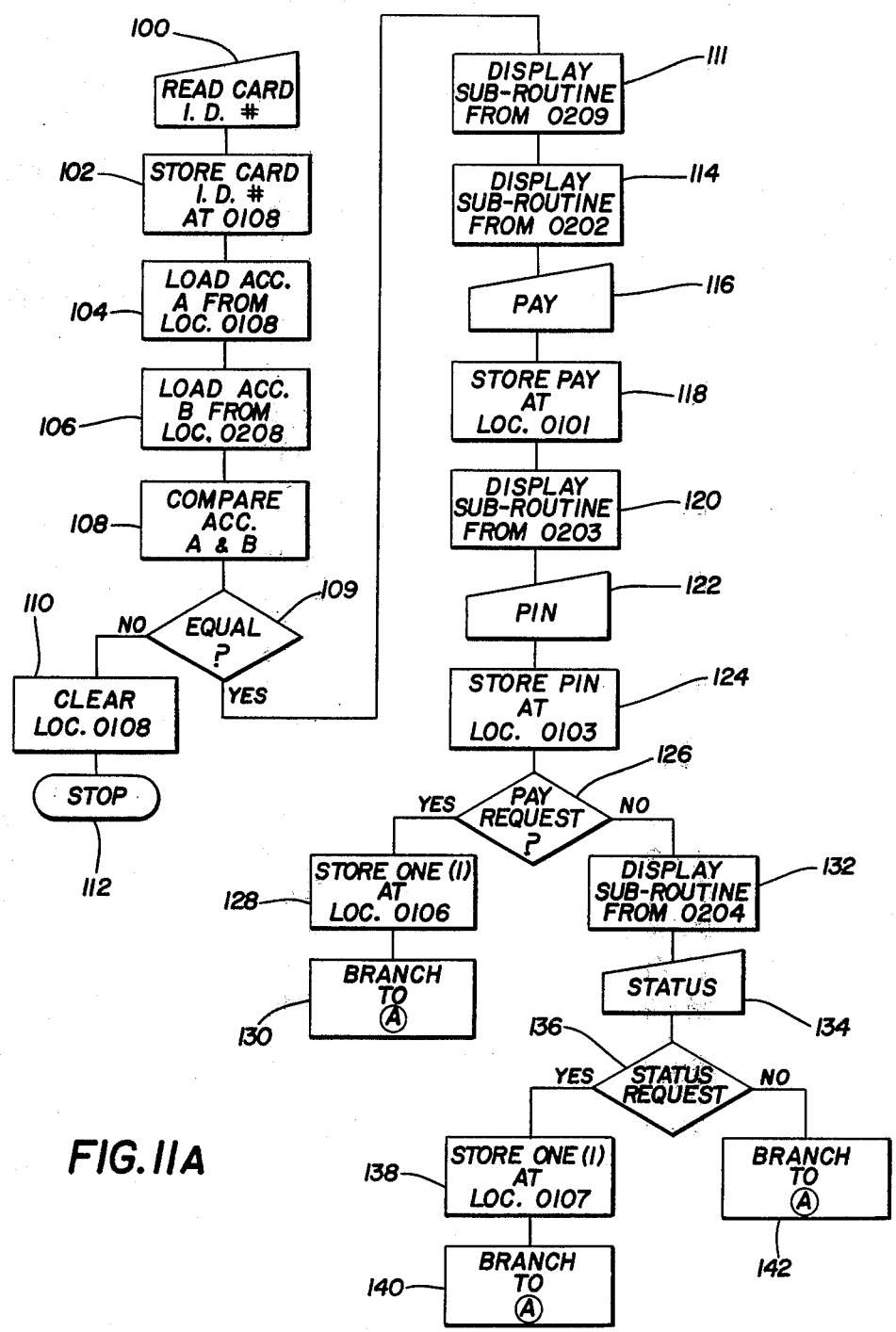
FIGS. 11a–11d are a block diagram representing firmware for programming the microprocessor shown in FIG. 1.

Referring first to FIG. 11a, the vendee first inserts identification card 40 into inlet 38 of the housing 22 to cause the magnetic stripe 42 to be read by magnetic head 44 (see sequence block 100). The identification number read from stripe 42 is stored at location 0108 in RAM 76 (block 102). The card identification number is now transferred from memory location 0108 to accumulator A (block 104).

Accumulator B is loaded with the card number permanently stored at location 0208 of ROM 74 (block 106). The card read number in accumulator A is now compared with the prerecorded card number in accumulator A (block 108). If the two numbers are not equal to each other (block 109), indicating that the inserted identification card is not the one issued with the particular verificatory 20, the memory location 0108 containing the card read data is cleared (block 110) and the program is stopped (block 112).

If the two identification numbers stored in accumulators A and B are equal to each other, however, the subroutine from ROM location 0209 is operated to display a number stored at ROM location 0209 (block 111) which may be the logarithm of the card identification number. This displayed number is viewed by the vendor and written onto voucher 48 to verify that the vendor has actually viewed the verificatory 20 for additional security. The subroutine from ROM location 0202 is now executed to energize the pay indicator lamp P of readout 30 (block 114). The vendee keyboard enters the transaction amount followed by depression of the ENTER key (block 116) and that amount is stored in RAM 76 at location 0101 (block 118). The display subroutine stored in ROM location 0203 is operated to energize the "PIN" indicator lamp in readout 30 (block 120). The vendee now keyboard enters the PIN number (block 122) followed by depression of the ENTER key and that number is stored in RAM 76 at location 0103 (step 124). If the present transaction is a pay request (step 126), i.e., the vendee has made an entry in accordance with block 116, a logical one signal is stored in RAM 76 at location 0106 as a flag (block 128). If no transaction amount has been keyboard entered in accordance with block 116, the device 20 is programmed to enter a status request or transaction verification mode. In that mode, a display subroutine from ROM 74 at location 0204 is operated to energize the status indicator S in readout 30 (block 132). If an account status check is required, the vendee makes a status request by operating the "0" and ENTER keys in succession (block 134). If a status request is made (block 136), a logic one flag signal is stored in RAM 76 at location 0107 and the program branches to point A in FIG. 11b (block 140). Otherwise, the program branches directly to point A (block 142) without setting the flag bit at RAM location 0107.

Figure 11B:
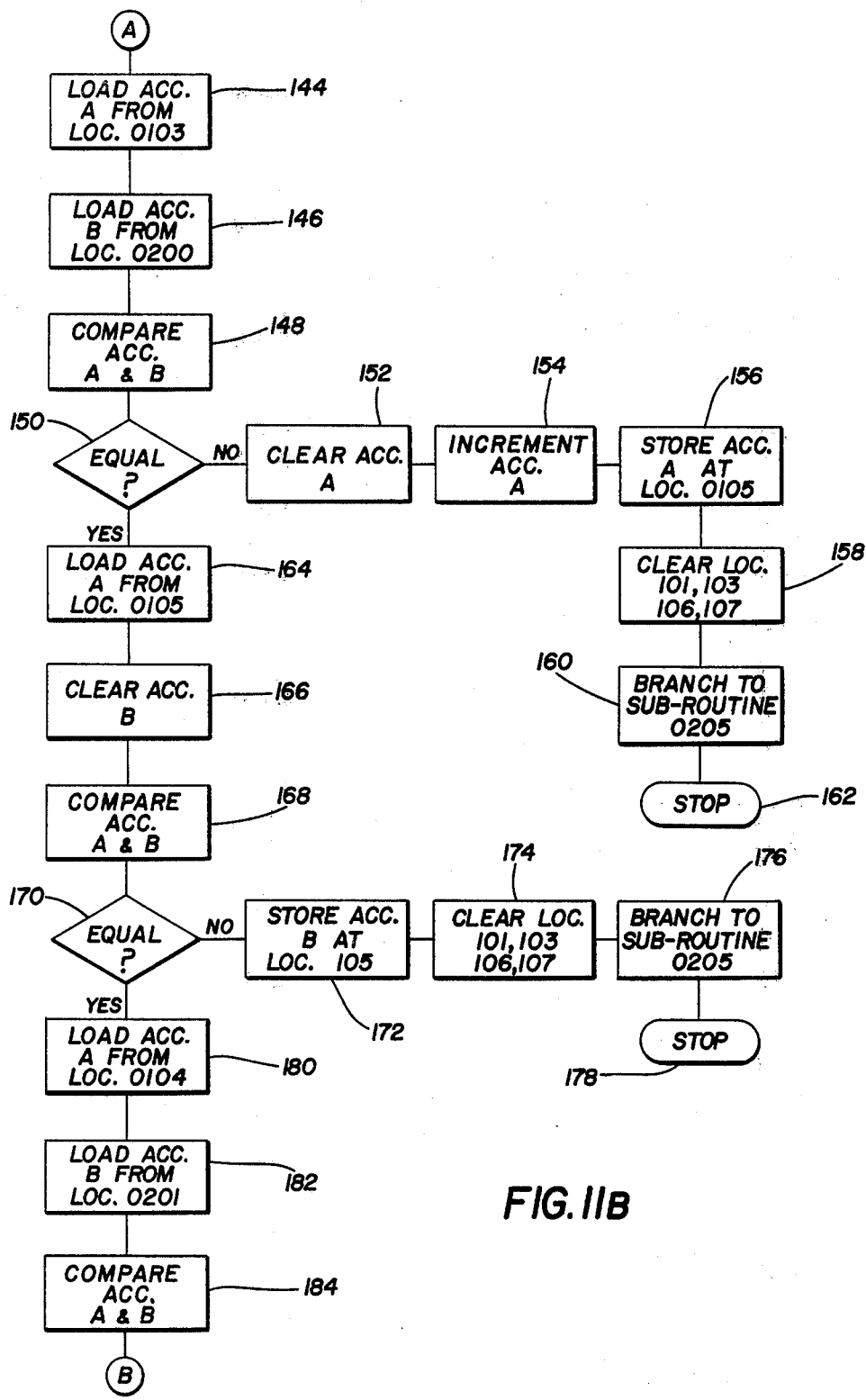
Figure 11C:
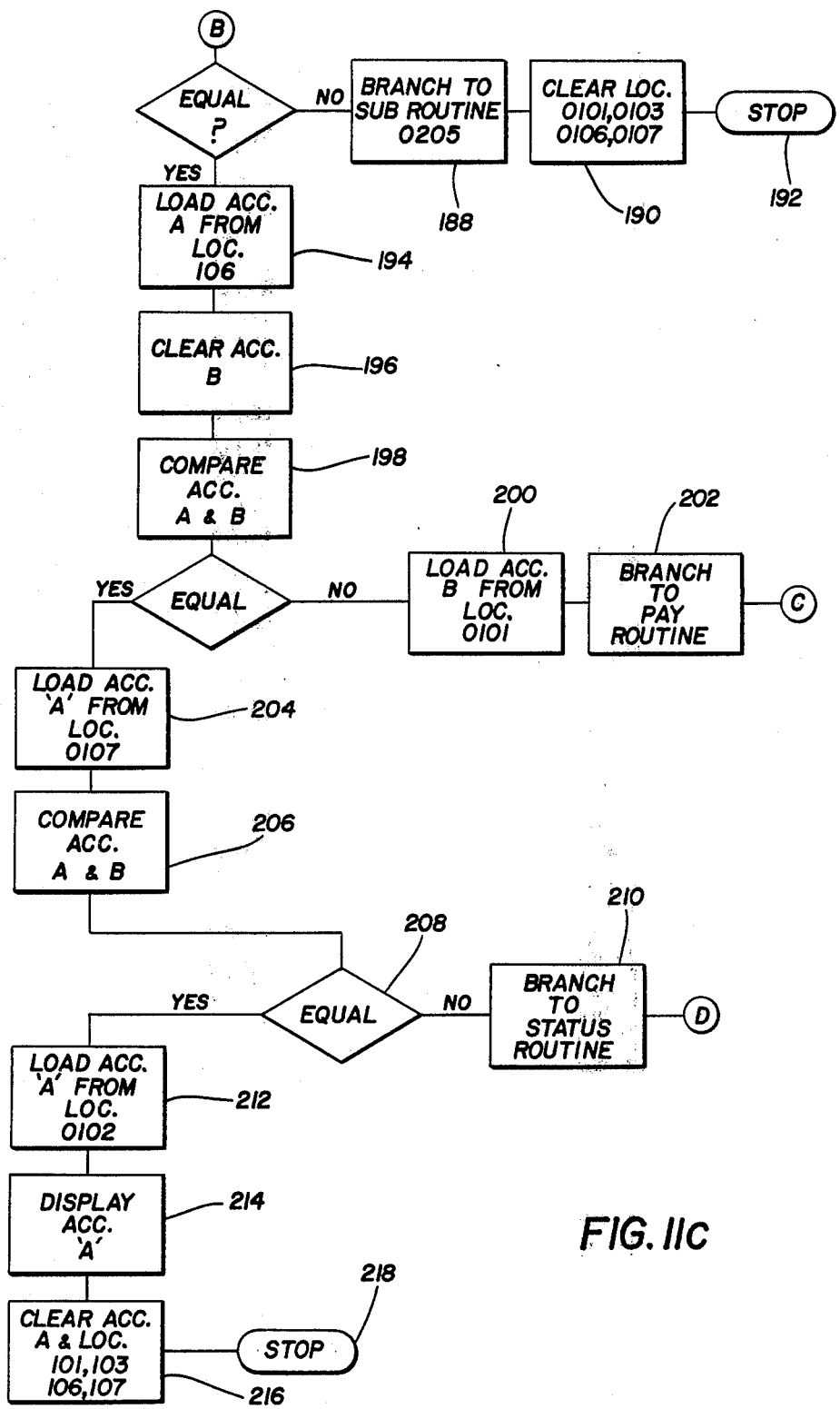

Referring now to FIG. 11b, the personal identification number stored at RAM location 0103 is loaded into accumulator A (block 144). The personal identification number prerecorded at ROM location 0200 is loaded into accumulator B (block 146). The contents of the two accumulators are compared with each other (block 148) to determine whether there is a match (block 150). If the two PIN numbers are unequal to each other, indicating that the keyboard entered number is improper, accumulator A is cleared (block 152) and incremented (block 154). The content of accumulator A, which has a decimal one value, is stored at RAM location 0105 (block 156). RAM locations 101, 103, 106 and 107 are now cleared (block 158) and subroutine 0205 (block 160) is operated to energize the INVALID lamp on readout 32 before stopping the program (block 162). It should be noted at this point that RAM location 0105 indicates that the PIN number has been improperly keyboard entered one time.

If the keyboard entered PIN number matches the PIN number stored in ROM 74, the flag bit stored in RAM location 0105 indicating that the personal identification number was previously incorrectly keyboard entered is loaded into accumulator A (block 164). Accumulator B is now cleared (block 166) and the two accumulators compared (block 168). Block 168 determines whether the content of accumulator B has a value of logic zero indicating that an improper PIN has not been previously entered or a value of logic one indicating that an improper PIN has been previously entered. If the contents of accumulators A and B do not match, i.e., the content of accumulator A has a value of one (block 170), the content of accumulator B is stored at RAM location 105, i.e., RAM location 105 is reset (block 172). RAM locations 101, 103, 106 and 107 are reset (block 174) and the display subroutine at ROM location 0205 is operated to energize the INVALID lamp on housing 22 (block 176) before stopping the program (block 178).

If, on the other hand, the contents of accumulators A and B are equal to each other in accordance with block 170, the program tests the integrity of RAM 76 by loading a control word stored at RAM location 104 into accumulator A (step 180) and then loading a corresponding control word stored at ROM location 0201 into accumulator B (block 182). Contents of accumulators A and B are compared with each other (block 184). If the contents of the two accumulators are unequal, indicating that RAM 76 has been tampered with, altered or otherwise has failed, display subroutine 0205 is executed to energize the INVALID indicator (block 188), RAM locations 0101, 0103, 0106 and 0107 are cleared (block 190) and the program is stopped (block 192). If the contents of the two accumulators A and B are equal to each other, however, the integrity of RAM 76 is considered to have been affirmed, and the flag bit stored at RAM location 106 indicating that a payment request has been initiated is loaded in accumulator A (block 194). Accumulator B is cleared (block 196) and the contents of accumulators A and B are compared with each other (block 198). This sequence merely tests the content of RAM location 106 to determine whether location 106 contains the flag bit. If the contents of accumulators A and B are not equal to each other, indicating that there is a flag bit at RAM location 106 identifying a pay request, the transaction amount stored at RAM location 0101 is loaded into accumulator B (block 200).

Figure 11D:
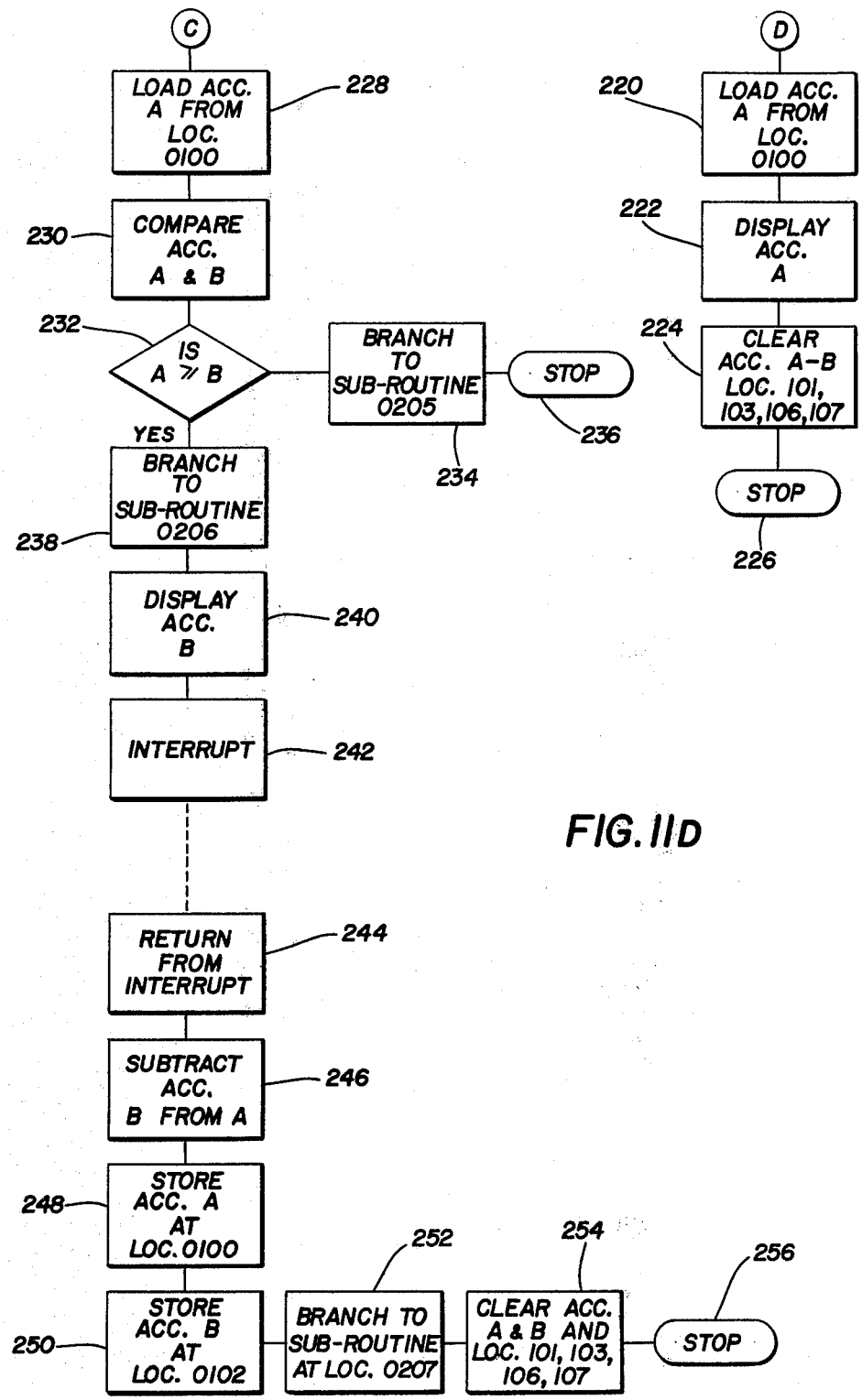

The program now branches to a pay routine (block 202) at point C in the program (FIG. 11d). If the contents of accumulators A and B are not equal to each other, however, indicating that a payment request has not been initiated, the content of RAM location 107 which identifies whether a status request has been initiated in accordance with block 134 is loaded into accumulator A (block 204). The contents of accumulators A and B (accumulator B has been previously cleared in accordance with block 196) are compared (block 206) to determine whether accumulator A contains a flag bit indicating a status request. If the contents of the two accumulators A and B are not equal to each other, indicating that there is a flag bit in accumulator A and that a status request has been made (block 208), the program branches to point D (FIG. 11d) to execute a status check routine. If the contents of accumulators A and B are equal to each other, however, there is no flag bit stored at RAM location 0107 and a transaction verification request is implied. Accordingly, the amount of the last transaction at RAM location 0102 is loaded into accumulator A (block 212) for display (block 214) at readout 26. Accumulator A in RAM locations 101, 103, 106 and 107 are now cleared (step 216) and the program is stopped (block 218).

Referring to FIG. 11d, if a status request has been made as determined in accordance with block 208, the account balance stored at RAM location 0100 is loaded into accumulator A (block 220) to be displayed (block 222) at readout 26. Accumulators A and B as well as RAM locations 101, 103, 106 and 107 are cleared (block 224) and the program is stopped (block 226).

Assuming that a pay request has been made in accordance with block 126, the account balance stored at RAM location 0100 is loaded into accumulator A (step 228). The contents of accumulators A and B (accumulator B contains the amount of the purchase transaction obtained from RAM location 0101 in accordance with block 200) are compared (block 230). If the content of accumulator A is less than the content of accumulator B (block 232) indicating that there are insufficient funds to support the payment transaction, subroutine 0205 (block 234) is executed to energize the INVALID lamp and the program is stopped (block 236). If the content of accumulator A is greater than or equal to the content of accumulator B, on the other hand, indicating that there are sufficient funds to support the requested payment transaction, subroutine 0206 stored in RAM is executed to energize the VALID lamp (block 238).

The content of accumulator B identifying the transaction amount is displayed at readout 26 (block 240) and the program is interrupted (block 242). The program interruption is removed in response to closure of switch 69 (FIG. 10) during a transaction verification printing operation using print bar 50 (block 244). The amount of the transaction stored in accumulator A is subtracted from the account balance stored in accumulator B (block 246) and the resultant balance is stored at RAM location 0100 (block 248). The content of accumulator B (transaction amount) is stored at RAM location 0102 (block 250). The display subroutine at ROM location 0207 is now executed to display the word PAID on the alphanumeric display of readout 26 (block 252). Accumulators A and B as well as RAM location 101, 103, 106 and 107 are cleared (block 252) and the program is stopped (block 254).

In this disclosure there is shown and described only the preferred embodiment of the invention, but, as aforementioned, it is to be understood that the invention is capable of use in various other combinations and environments and is capable of changes or modifications within the scope of the inventive concept as expressed herein. For example, the verificatory 20 in addition to financial security is useful and beneficial in personel security to authorize entry to a restricted area or to provide personnel identification. The verificatory 20 sans printer may, for example, be carried by a person seeking entry to a restricted area and an imprinter maintained by a guard. A prearranged pass code number is displayed to the guard. The pass code display is displayed in the device for next guard who may require still another number. The imprinted document becomes a record of entry. A copy becomes part of the badge to be carried by the authorized entrant. The verificatory 20 will gradually run out of authorization numbers which will require reloading. This is another security feature as high security would require limited number of authorized entrants. In another mode, the verificatory and imprinter are both maintained by the guard and the authorized person has the card and knows the PIN number. A different coded magnetic card would operate the verificatory in highly restricted areas and would require knowledge of a different PIN number. In still another mode, armies, especially armies on foreign soil, could receive pay or portion via loading of the device and still use the device in its simple form for security entry and identification. The service serial number of the individual would be programmed in the verificatory as the personal identification number. Of particular significance, a single verificatory 20 may be used in the financial and access security environments as well as other environments without modification.

The system described above, while ideal in an electronic funds transfer (EFT) environment will also guarantee standard checks by imprinting verification bands on the back of the check while debiting the account balance stored in the verificatory 20.

I claim:

1. An apparatus for transferring funds data in lieu of cash, comprising a portable unit to be carried by a vendee, said portable unit including a keyboard for manually entering transaction and identification data, terminal means accessible only by an authorized institution for receiving an initial funds balance; means coupled to said terminal means for storing a funds balance, means responsive to said keyboard for storing a requested transaction amount, means for storing vendee identification data issued by said institution, means responsive to said keyboard for storing vendee entered identification data, means for comparing said stored identification data with said keyboard entered identification data and for generating a first signal in response to a positive comparison, means for comparing said stored funds balance with said requested transaction amount and for generating a second signal if said funds balance is at least as large as said requested transaction amount, an inlet for receiving a voucher issued by a vendor, manually actuated printing roll means within said inlet for printing encoded identification data onto said voucher to verify the transaction, means for maintaining said printing roll means normally out of contact with said voucher within said inlet, means for manually moving said printing roll means into contact with said voucher, means responsive to said manual means and to said first and second signals for updating said stored funds balance by said requested transaction amount, and display means for displaying said stored funds balance and said requested transaction amount.

2. A system for transferring funds data between a vendee and vendor in lieu of cash, comprising a fixed unit located at a sponsoring institution for generating credit data to be provided to member vendees; an identification card carried by each of said vendees containing prerecorded vendee identification data; pluralities of vouchers carried by member vendors for recording purchase amounts; and a portable unit to be carried by each of said vendees for making purchases, said portable unit including a keyboard for manually entering transaction and identification data, terminal means accessible by only the sponsoring institution for receiving an initial funds balance corresponding to initial credit; means coupled to said terminal means for storing a funds balance; means responsive to said keyboard for storing a requested transaction amount; means for storing vendee identification data issued by said institution; means responsive to said keyboard for storing vendee entered identification data; means for comparing said stored identification data with said keyboard entered identification data and for generating a first signal in response to a positive comparison; means for comparing said stored funds balance with said requested transaction amount and for generating a second signal if said funds balance is at least as large as said requested transaction amount; an inlet for receiving singly said vouchers issued by the vendor; manually actuated printing roll means within said inlet for printing encoded identification data onto said voucher to verify the transaction; said printing roll means including means for maintaining said printing roll means normally out of contact with said voucher, means for manually moving said printing roll means into contact with said voucher, means responsive to said manual means and to said first and second signals for updating said stored funds balance by said requested transaction amount, and display means for displaying said stored funds balance and said requested transaction amount.

3. The apparatus of claim 1 or claim 2, wherein said printing roll means includes a roll containing longitudinally spaced apart bands having widths and interband spacings corresponding to said encoded identification data.

4. The apparatus of claim 1, wherein the portable unit includes a second inlet for receiving at least an edge portion of an encoded card, means within said second inlet for reading data on said card, means for comparing said card read data with prerecorded data and means responsive to said comparing means for enabling said keyboard.

5. The apparatus of claim 2, wherein said portable unit includes a second inlet for receiving at least an edge portion of said identification card, means within said second inlet for reading data on said card, means for comparing said card data with prerecorded data and means responsive to said comparing means for enabling said keyboard.

6. The invention of claim 4 or claim 5, including means responsive to said card reading means for displaying data corresponding to card read data to be recorded by said vendor.

7. The invention of claim 1 or claim 2, wherein said display means includes a numerical readout for displaying stored numerical data.

8. The apparatus of claim 7, wherein said display means further includes status lamps for indicating an operating status of said portable unit.

9. An apparatus for transferring funds data in lieu of cash, comprising a portable unit to be carried by a vendee, said portable unit including a keyboard for manually entering transaction identification data, terminal means accessible only by an authorized institution for receiving an initial funds balance, means coupled to said terminal means for storing a funds balance, means responsive to said keyboard for storing a requested transaction amount, means for storing vendee identification data issued by said institution, means responsive to said keyboard for storing vendee entered identification data, means for comparing said stored identification data with said keyboard entered identification data and for generating a first signal in response to a positive comparison, means for comparing said stored funds balance with said requested transaction amount and for generating a second signal if said funds balance is at least as large as said requested transaction amount, a first inlet for receiving at least an edge portion of an identification card, means within said first inlet for reading data prerecorded on said card, means for comparing said card read data with stored data, means responsive to said card data comparing means for enabling said keyboard, a second inlet for receiving a voucher issued by a vendor, manually actuated printing means within said second inlet for printing encoded identification data onto said voucher to verify the transaction, and means responsive to said printing means and to said first and second signals for up-dating said stored funds balance by said requested transaction amount.

10. The apparatus of claim 9, including display means for displaying said stored funds balance and said requested transaction amount.

11. The apparatus of claim 9, including means for displaying a number related to the card read data, the vendor recording said displayed number on said voucher to complete verification of said transaction.

12. A system for identifying an individual as being authorized to be excepted from a general restriction, comprising an identification card carried by each authorized individual containing prerecorded identification data, pluralities of vouchers located at verification stations and a portable unit to be carried by each authorized individual, each said portable unit including a keyboard for manually entering identification data, means for storing prerecorded identification data, means for storing changeable data, means responsive to said keyboard and to said stored identification data for making a comparison between the keyboard entered identification data and stored identification data, a first inlet for receiving at least an edge portion of said identification card, means within said first inlet for reading encoded data on said card, means for comparing said card read data with corresponding prerecorded card data, means responsive to said card data comparing means for enabling said keyboard, a second inlet for receiving vouchers, printing means within said second inlet for printing verification data on said vouchers and means responsive to said printing means and said first comparing means for up-dating said stored changeable data.

13. The invention as defined in any of claims 1, 2, 9 or 12 including a flap for enclosing said print roll inlet, said flap being biased into a position to disable said printing roll means in the absence of a voucher.

* * * * *